C. M. BEARDSLEY, DEC'D.
H. M. BEARDSLEY, ADMINISTRATRIX.
VULCANIZING APPARATUS.
APPLICATION FILED FEB. 8, 1913.
1,152,267. Patented Aug. 31, 1915.
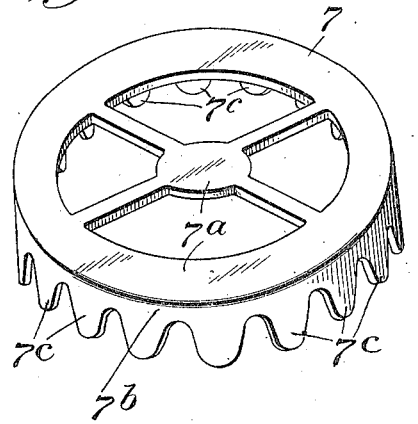
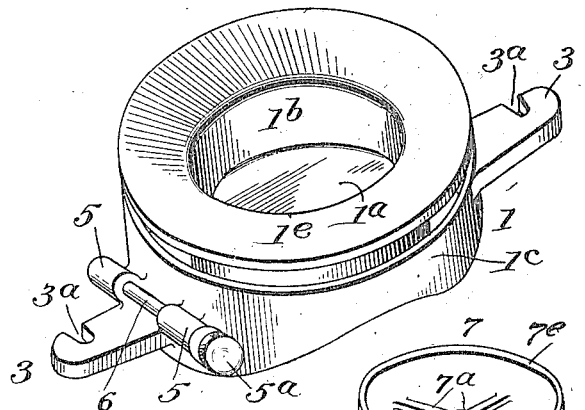
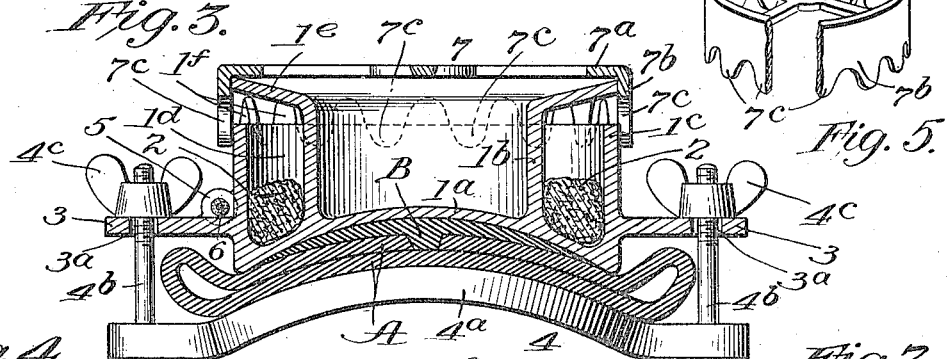
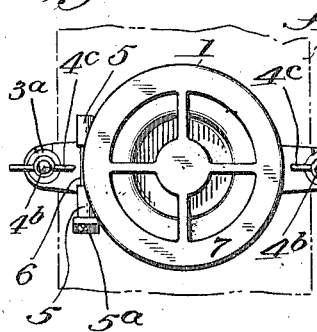
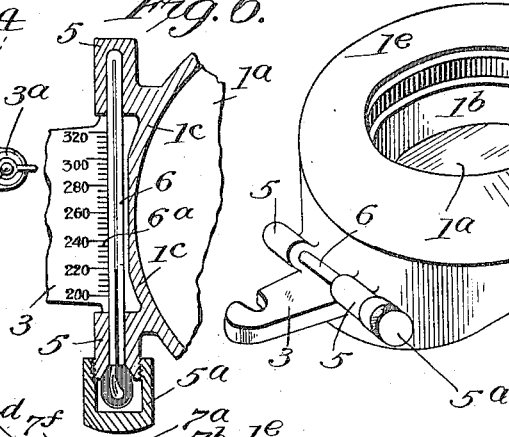
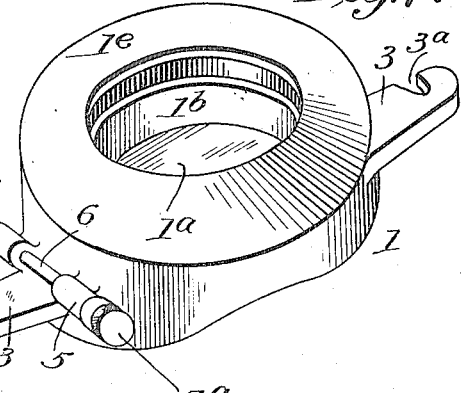
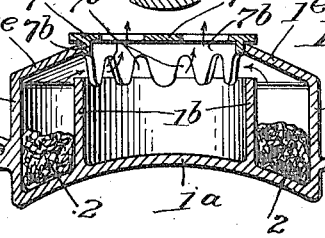

UNITED STATES PATENT OFFICE.

CHARLES M. BEARDSLEY, OF CLEVELAND, OHIO; HARRIET MARION BEARDSLEY ADMINISTRATRIX OF SAID CHARLES M. BEARDSLEY, DECEASED.

VULCANIZING APPARATUS.

1,152,267.   Specification of Letters Patent.   Patented Aug. 31, 1915.

Application filed February 8, 1913. Serial No. 747,083.

*To all whom it may concern:*

Be it known that I, CHARLES M. BEARDSLEY, a citizen of the United States, residing at Cleveland, in the county of Cuyahoga and State of Ohio, have invented certain new and useful Improvements in and Relating to Vulcanizing Apparatus, of which the following is a specification.

This invention relates to a vulcanizing apparatus.

It is particularly adapted for use in the repairing of tires, inner tubes, and tire treads or shoes of rubber and for similar purposes.

One object of my invention is to provide a simple, cheap and highly efficient vulcanizer adaptable for quick repair service on bicycle, motor cycle, and motor car tires, tire parts and the like, and for similar purposes.

Another object is to provide such a vulcanizer in which gasolene, alcohol or the like may be used for gas generating purposes, so constructed that the gases generated will burn normally with a blue flame, indicating first class combustion.

Another object of my invention is to provide means for regulating and controlling the heat at or about the vulcanizing temperature to insure satisfactory work.

Other objects of my invention will be clear to one skilled in the art from a study of the construction and operation of the vulcanizers which, for the purpose of illustration, I have, in the accompanying drawings, shown and herein described as embodying my invention.

Figure 1 is a perspective view of a vulcanizer embodying my invention. Fig. 2 is a perspective view of a heat controller which is adapted to be used in connection with my vulcanizer. Fig. 3 is a longitudinal sectional view through the vulcanizer and heat controller, the former being clamped to a tire tube and in position for repairing it. Fig. 4 is a fragmentary view of a tire on a wheel and my vulcanizer and heat retainer fixed thereto for the purpose of repairing the tire. Fig. 5 is a perspective view, partly broken away, of a flame regulator or controller embodying a slightly modified form of my invention. Fig. 6 is a fragmentary sectional view, somewhat enlarged, showing the thermometer and its supporting members. Fig. 7 is a perspective view illustrating a modification of the invention. Fig. 8 is a longitudinal sectional view of the vulcanizer shown in Fig. 7 and a heat controller, the latter being constructed to coöperate with the modified form of vulcanizer.

In the drawings, 1 indicates a vulcanizer arranged to engage with a tire or other article A which is to be vulcanized or repaired. The vulcanizer 1 comprises a bottom or vulcanizing plate $1^a$, and inner and outer walls $1^b$, $1^c$, the latter coöperating with the bottom $1^a$ to form a gas or fuel chamber $1^d$. The bottom $1^a$ is preferably concave in shape in order to adapt it to the general shape of a vehicle tire. The walls $1^b$, $1^c$, are preferably of annular shape and arranged concentrically with respect to each other to form an annular shaped gas or fuel chamber. The outer wall $1^c$ may be arranged adjacent to the peripheral edge of the bottom $1^a$.

2 indicates a wick of suitable construction which may be arranged within the gas or fuel chamber $1^d$.

$1^e$ indicates a conductor plate or member extending over the gas or fuel chamber $1^d$. The plate $1^e$ is preferably of annular shape and may be integrally formed with either wall $1^b$ or $1^c$. The plate $1^e$ inclines slightly upwardly from the wall to which it is secured so as to leave an annular space or opening between its lower surface or peripheral edge and the upper edge of the wall $1^c$, thus forming an annular jet or gas orifice $1^f$.

In the modified form of the invention shown in Figs. 7 and 8 the plate $1^e$ is integrally connected to the outer wall $1^c$ and extends inwardly and upwardly, forming an annular space or gas orifice $1^f$ between its lower surface and the upper edge of the wall $1^b$.

In Figs. 1 and 3, which illustrate the preferred form of the invention, the plate $1^e$ is formed integrally with the inner wall $1^b$ and extends outwardly and upwardly over the gas or fuel chamber $1^d$. The plate $1^e$ serves as a heat conducting element to conduct to the vertical wall which supports it the heat it acquires or takes up, which vertical wall in turn transmits the heat by conduction to the bottom 1ª. The plate 1ᵉ coöperates with the walls 1ᵇ, 1ᶜ, to form a suitable chamber for the gasification of the fuel so that a gas which will burn with a blue flame indicating proper combustion without waste or the production of undesirable gases, is generated and delivered and burned at the orifice 1ᶠ. Extending laterally from opposite sides of the vulcanizer 1 and preferably formed integral therewith, are members 3 which permit the vulcanizer 1 to be clamped in operative position against the tire A when it is desired to repair the latter. The members 3 are recessed or formed with openings 3ª for a purpose to be hereinafter described.

4 indicates means arranged to coöperate with the members 3 to secure the vulcanizer 1 in operative position. Referring to Fig. 3, wherein the vulcanizer is applied to a tire tube A that has been removed from a casing or shoe, the clamping means 4 comprise a base member 4ª, on which the tube A is laid, bolts 4ᵇ at its opposite sides arranged to extend through the openings 3ª of the members 3, and thumb nuts or equivalent devices 4ᶜ which, when screwed down, engage the members 3 in a well known manner and effect the clamping of the vulcanizer 1 in operative position against the tube A. When it is desired to clamp the vulcanizer 1 to a tire casing without removing the latter from the wheel, as shown in Fig. 4, the clamping means 4 may consist of a chain (not shown) passed around the rim of the wheel, the opposite ends of the chain being provided with bolts 4ᵇ adapted to extend through the openings 3ª and receive nuts 4ᶜ.

5 indicates a pair of lugs preferably formed integral with the vulcanizer 1. These lugs are suitably bored to receive and support a thermometer 6 in close proximity to the outer wall 1ᶜ and bottom wall 1ª of the vulcanizer 1, a cap 5ª being provided and having screw-threaded engagement with one of said lugs to hold the thermometer in position. The lugs 5 are preferably arranged at the opposite sides of one of the clamping members 3 in order that the upper surface of the latter may, if desired, serve as the scale 6ª for the thermometer 6.

7 indicates a heat regulator or controller arranged to be mounted on the vulcanizer 1 as will be hereinafter described. The regulator 7 comprises a frame 7ª preferably of skeleton form and provided with a flange 7ᵇ, which is adapted to removably engage with the peripheral edge of the plate 1ᵉ, and a plurality of members 7ᶜ depending from the flange 7ᵇ and uniformly spaced relatively to each other therearound. When the frame 7ª is placed on the vulcanizer 1 as shown in Fig. 3, the engagement of the flange 7ᵇ with the annular plate 1ᵉ serves to maintain the frame in position thereon. The members 7ᶜ are of a length to bridge the annular orifice 1ᶠ between the conducting plate 1ᵉ and the upper edge of the wall 1ᶜ and serve to partially close the gas outlet for gas or fuel chamber 1ᵈ, whereby the amount of heat generated by the flames issuing from the orifice 1ᶠ is reduced, more of it is radiated before reaching the vulcanizing plate 1ª, and the temperature of that plate for a short interval may be maintained almost constant at the vulcanizing temperature required. It will of course be understood that the bridging members 7ᶜ are of such size that the openings or spaces between them will be large enough to permit sufficient air to reach the gas orifice 1ᶠ to keep the flame thereat from being entirely smothered.

When the regulator 7 is to be adapted to the form of the invention shown in Figs. 7 and 8, the frame 7ª is somewhat smaller in size than the vulcanizer 1 in order that its flange 7ᵇ and bridging members 7ᶜ may engage with the plate 1ᵉ and inner wall 1ᵇ, respectively. When used with this form of construction, the frame 7ª is provided with a rim 7ᵈ which rests on the upper edge or surface of the plate 1ᵉ, this rim 7ᵈ coöperating with the flange 7ᵇ to support the frame 7 in proper position on the vulcanizer 1.

As shown in Fig. 5 the element 7 may be provided with an annular flange 7ᵉ extending in the opposite direction to the serrated flange 7ᵇ, the flange 7ᵉ, serving when placed over the jet orifice 1ᶠ to put out any flame at that point.

In operation, the vulcanizer 1 is clamped in operative position against the rubber part A to be repaired, a suitable quantity of prepared rubber B to be vulcanized to the part A to effect the repair being first properly positioned between the part A and the plate 1ª. The proper amount of fuel, such as gasolene, say a teaspoonful or two, is poured into the gas or fuel chamber 1ᵈ and the gas issuing through the orifice 1ᶠ is then ignited, gas being formed in the usual manner. As a result of the operation, the walls 1ᵉ, 1ᵇ, and 1ᶜ, soon become heated and through them heat is quickly conducted to the vulcanizing wall 1ª to raise it to the desired degree of temperature, say for example, 265 degrees Fahrenheit, at which vulcanization of the materials used will take place. Substantially the temperature of the wall 1ª will be shown by the thermometer 6. When the thermometer indicates that the vulcanizer 1 has been heated to approximately 265 degrees F., the heat controller 7 is placed on the vulcanizer 1, as shown in Figs. 3, 4, and 8, and allowed to remain in such position until the repair is completed. The heat controller 7 has the effect of maintaining the temperature of the vulcanizer 1 at the desired degree, or substantially so, for a period long enough to permit the vulcanizing process to be completed. This operation of the controller or regulator 7 may be attributed to the fact that it muffles the flame at the space 1$^f$ and also provides additional radiation facilities.

The construction of the burner at 1$^b$, 1$^c$, 1$^e$ and 1$^f$, is such that in actual practice working on gasolene and the like, the gas issuing at the orifice 1$^f$ burns with a blue flame indicating good combustion. The principal metal parts of the vulcanizer may be made preferably of aluminum, brass, copper or some other relatively cheap metal or alloy which is a good conductor of heat. The construction of the apparatus is such that it will operate substantially the same in any position in which it may be found necessary to place it. By confining the flame to a relatively small annulus the dangerous and inefficient characteristics of operation of vulcanizing devices with open chambers for combustible fluid are avoided. It will be noted that the walls 1$^b$, 1$^c$ and 1$^e$ serve to form a gas or fuel chamber 1$^d$ in which the gas collects or is generated and from which it issues at the gas orifice 1$^f$; and that this gas orifice 1$^f$ is annular in shape so that when the gas is ignited, the flame impinges upon the free edge of the plate 1$^e$ about its periphery. And it will be further noted that in the preferred embodiment of my invention heat is conducted by the plate 1$^e$ and wall 1$^b$ to the central part, the most effective part for vulcanizing purposes, of the plate 1$^a$.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:—

1. In apparatus of the class described, the combination of a vulcanizing plate, inner and outer walls extending therefrom and forming therewith a gas or fuel chamber, and a heat conductor connected with one of said walls extending therefrom across said gas or fuel chamber and over the other said wall and having its under surface disposed to form with the upper edge of the latter said wall a passageway for the escape of gas.

2. In apparatus of the class described, the combination of a plate adapted to engage the article to be vulcanized, walls forming an annular gas or fuel chamber extending around said plate near the periphery thereof, and a heat conductor arranged above said gas or fuel chamber connected with one of said walls and having its free edge disposed to form with the free edge of the other said wall a gas orifice.

3. In apparatus of the class described, the combination of a vulcanizing plate, inner and outer walls extending from the vulcanizing plate and coöperating therewith to form a gas or fuel chamber spaced from the center of said vulcanizing plate, and a heat conductor arranged above the gas or fuel chamber, carried by and extending laterally from one of said walls and forming between its under surface and the upper edge of the other wall an annular gas orifice.

4. In apparatus of the character described, the combination of a vulcanizing plate adapted to engage the article to be vulcanized, inner and outer walls disposed upon said plate and forming therewith a gas or fuel chamber spaced from the center of said vulcanizing plate, a heat conducting plate arranged above said gas or fuel chamber, connected along its inner edge with the outer edge of the inner of said walls of said gas or fuel chamber and having its other edge spaced from and forming with the outer edge of the outer wall of said gas or fuel chamber a gas orifice, whereby the outer edge of the said heat conducting plate is in the direct path of the flames which issue from said gas orifice, and heat is conducted by said heat conducting plate from its free edge to said inner wall and thence to said vulcanizing plate.

5. Apparatus of the character described, comprising a vulcanizing plate adapted to engage the article to be vulcanized, walls thereon forming an annular gas or fuel chamber spaced from the center of said plate, a heat conducting plate arranged above said chamber, the said heat conducting plate being connected with the inner wall of said chamber and having its outer edge spaced from and forming with the outer wall of said gas or fuel chamber an annular passageway for the escape of gas.

6. Apparatus of the class described, comprising a plate adapted to engage the article to be vulcanized, inner and outer annular walls coöperating with said plate to form an annular gas or fuel chamber, the said plate and inner and outer walls being formed integrally, and an annular heat conducting plate connected with said inner wall and extending outwardly therefrom over said gas or fuel chamber and forming with the upper edge of the said outer wall an annular gas orifice.

7. An apparatus of the character described, comprising a vulcanizing plate adapted to engage the article to be vulcanized, walls forming an annular gas or fuel chamber above said plate, an annular heat conducting plate arranged above said chamber, the said heat conducting plate being connected along its inner edge with the inner wall of said chamber and its outer edge being spaced from and forming with the outer walls of said gas or fuel chamber an annular passageway for the escape of gas, and a heat controller having spaced members arranged to bridge said annular passageway between said heat conducting plate and one wall of said gas or fuel chamber.

8. Apparatus of the character described, comprising a vulcanizing plate adapted to engage the article to be vulcanized, walls forming an annular chamber above said plate and arranged to receive gas or fuel, an annular heat conducting plate arranged above said chamber, the said heat conducting plate being connected along one of its peripheral edges with one wall of said chamber and its other peripheral edge being spaced from and forming with the other wall of said gas or fuel chamber an annular passageway for the escape of gas, and a heat controller removably mounted on said heat conducting plate and provided with members arranged to bridge the said annular passageway for gas.

9. Apparatus of the class described, comprising a plate adapted to engage the article to be vulcanized, inner and outer annular walls coöperating with the plate to form an annular gas or fuel chamber, the said plate, and inner and outer walls being formed integrally, an annular shaped heat conducting plate connected along its inner edge with said inner wall, extending outwardly therefrom over said gas or fuel chamber and forming an annular gas orifice between it and the upper edge of the outer wall, and a heat controller arranged to removably engage said heat conducting plate and being provided with a series of spaced members arranged to bridge said gas orifice.

10. In apparatus of the class described, the combination of a vulcanizing plate, inner and outer walls on said plate forming therewith a fuel receptacle, a heat conducting plate connected with one of said walls, arranged above said fuel receptacle and disposed to have its under wall form with the upper edge of the other of said walls a gas orifice, and a heat controller having members arranged to extend across said gas orifice and to control the heat of said vulcanizing plate during the vulcanization of an article.

11. In apparatus of the class described, the combination with a vulcanizer comprising a vulcanizing plate adapted to engage the article to be vulcanized and a fuel receptacle positioned upon said vulcanizing plate and having a gas orifice for the escape of gas, of a heat control frame arranged to removably engage said vulcanizer and having a flange or wall consisting of a series of spaced members for partially closing said gas orifice.

12. In apparatus of the class described, the combination with a vulcanizer comprising a vulcanizing plate adapted to engage the article to be vulcanized and a fuel receptacle positioned upon said vulcanizing plate and having a gas orifice for the escape of gas, of a heat control frame arranged to removably engage said vulcanizer and having a flange or wall consisting of a series of spaced members for partially closing said gas orifice, and another wall for entirely closing said gas orifice.

13. In an apparatus of the class described, the combination of a vulcanizing plate, inner and outer walls extending therefrom and spaced from the center thereof, a heat conductor connected with one of said walls and having its free edge disposed to form with the free edge of the other said wall a passageway for the escape of gas, and means for receiving liquid fuel disposed between said inner and outer walls.

14. In an apparatus of the class described, the combination of a vulcanizing plate, inner and outer walls extending from said vulcanizing plate, a heat conductor carried by and extending laterally from one of said walls and disposed to form an annular gas orifice between the free edge of said heat conductor and the adjacent free edge of one of said walls, and an annular wick disposed between the said walls to receive a liquid fuel.

In testimony whereof I affix my signature, in the presence of two witnesses.

CHARLES M. BEARDSLEY.

Witnesses:
R. H. JAMISON,
RICHARD INGLIS.

Copies of this patent may be obtained for five cents each, by addressing the "Commissioner of Patents, Washington, D. C."